US009813943B2

(12) United States Patent
Takase

(10) Patent No.: US 9,813,943 B2
(45) Date of Patent: Nov. 7, 2017

(54) APPARATUS AND METHOD FOR CONTROLLING AN OCCUPANCY RATIO OF EACH REGION IN A BUFFER

(71) Applicant: FUJITSU LIMITED, Kawasaki-shi, Kanagawa (JP)

(72) Inventor: Ryo Takase, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 14/462,304

(22) Filed: Aug. 18, 2014

(65) Prior Publication Data

US 2015/0055660 A1    Feb. 26, 2015

(30) Foreign Application Priority Data

Aug. 21, 2013   (JP) .................................. 2013-171769

(51) Int. Cl.
| | |
|---|---|
| *H04W 28/14* | (2009.01) |
| *H04L 12/863* | (2013.01) |
| *H04L 12/801* | (2013.01) |
| *H04W 28/02* | (2009.01) |
| *H04W 72/12* | (2009.01) |

(52) U.S. Cl.
CPC ........... *H04W 28/14* (2013.01); *H04L 47/127* (2013.01); *H04L 47/6215* (2013.01); *H04W 28/0205* (2013.01); *H04W 72/1252* (2013.01)

(58) Field of Classification Search
None
See application file for complete search history.

(56) References Cited

U.S. PATENT DOCUMENTS

| | | | | |
|---|---|---|---|---|
| 5,896,511 A | * | 4/1999 | Manning ........... | G06F 15/17375 709/232 |
| 6,388,993 B1 | * | 5/2002 | Shin .................... | H04L 12/5693 370/233 |

(Continued)

FOREIGN PATENT DOCUMENTS

| | | |
|---|---|---|
| JP | 2006-113798 A | 4/2006 |
| JP | 2008-539613 A | 11/2008 |

(Continued)

OTHER PUBLICATIONS

RapidIO Interconnect Specification Part 6: LP-Serial Physical Layer Specification, Rev. 2.2, Jun. 2011, pp. 131-166.*

(Continued)

*Primary Examiner* — Donald Mills
(74) *Attorney, Agent, or Firm* — Arent Fox LLP

(57) ABSTRACT

A buffer control device included in a base station apparatus acquires predetermined information regarding data communication between the base station apparatus and external apparatuses other than the base station apparatus. The buffer control device predicts an amount of traffic in the data communication based on the acquired predetermined information, and controls an occupation ratio of each of regions that are arranged in a buffer in association with a plurality of priorities, based on the amount of traffic in the predicted data communication, where the buffer stores pieces of data each of which is assigned one of the plurality of priorities and transmitted within the base station apparatus from a first processing unit to a second processing unit via a high speed serial interface.

7 Claims, 14 Drawing Sheets

(56) References Cited

U.S. PATENT DOCUMENTS

| | | | | |
|---|---|---|---|---|
| 6,690,646 B1* | 2/2004 | Fichou | ................ | H04L 41/0896 |
| | | | | 370/231 |
| 7,987,229 B1* | 7/2011 | Kinne | ..................... | G06F 13/28 |
| | | | | 709/200 |
| 8,238,339 B1* | 8/2012 | Wang | .................. | H04L 12/4625 |
| | | | | 370/369 |
| 8,254,399 B1* | 8/2012 | Wang | ................... | H04L 49/205 |
| | | | | 370/401 |
| 2004/0221059 A1* | 11/2004 | Bush | ....................... | H04L 29/06 |
| | | | | 709/238 |
| 2006/0056346 A1* | 3/2006 | Vadgama | ................ | H04L 47/14 |
| | | | | 370/329 |
| 2006/0234704 A1* | 10/2006 | Lee | ....................... | H04L 1/0006 |
| | | | | 455/434 |
| 2011/0302390 A1* | 12/2011 | Copeland | ............. | H04B 1/0003 |
| | | | | 712/2 |
| 2012/0044941 A1 | 2/2012 | Nakayama | | |

FOREIGN PATENT DOCUMENTS

| | | |
|---|---|---|
| JP | 2010-218108 A | 9/2010 |
| WO | WO 2006/113302 A1 | 10/2006 |
| WO | WO 2010/122896 A1 | 10/2010 |

OTHER PUBLICATIONS

Japanese Office Action of related Japanese Patent Application No. 2013-171769 dated Apr. 18, 2017.

* cited by examiner

FIG.5

| NUM-BER | PARAMETER FACTOR AND INFORMATION | WEIGHTING FACTOR 1 | WEIGHTING FACTOR 2 |
|---|---|---|---|
| 1 | NUMBER OF UEs REQUESTING DATA COMMUNICATION | 10 | 1.5 |
| 2 | WHETHER UE CURRENTLY PERFORMING THE DATA COMMUNICATION EXISTS AND RETRANSMISSION AMOUNT | 9 | 1.5 |
| 3 | NUMBER OF USERS IN A COVERAGE CELL OF THE BASE STATION | 8 | 0.4 |
| 4 | WIRELESS COMMUNICATION STATE OF UE PERFORMING COMMUNICATION | 7 | 2.3 |
| 5 | DATA AMOUNT, WHICH IS TO BE TRANSMITTED TO UE, STAYED IN BB | 6 | 0.9 |
| 6 | NUMBER OF USER TERMINALS TO BE SUBJECTED TO HO | 5 | 3.2 |
| 7 | DATA AMOUNT TO BE SUBJECTED TO HO | 4 | 1.8 |

APPARATUS AND METHOD FOR CONTROLLING AN OCCUPANCY RATIO OF EACH REGION IN A BUFFER

CROSS-REFERENCE TO RELATED APPLICATION

This application is based upon and claims the benefit of priority from the prior Japanese Patent Application No. 2013-171769 filed on Aug. 21, 2013, the entire contents of which are incorporated herein by reference.

FIELD

Exemplary embodiments of the present disclosure are related to apparatus and method for controlling an occupancy ratio of each region in a buffer.

BACKGROUND

A high speed serial interface such as SRIO (Serial Rapid IO) is known as a technology which connects devices with each other. For example, SRIO is also used in a processing unit such as a baseband processing unit which performs a signal processing for wireless signal in a base station of a wireless communication system. Respective processing modules within the baseband processing unit are connected with each other in a star shape using a SRIO switch, and transmit and receive data through a data communication path of a SRIO packet.

A receiver-side flow control is generally used for a flow control in SRIO communication and thus, a flow control buffer is provided on a transmission side. The space of the buffer for transmission is fixedly divided into regions to be allocated for respective "High", "Mid", and "Low", each of which is a priority of SRIO packets.

The SRIO switch sequentially stores SRIO packets in the region of a retransmission buffer corresponding to the priority of each SRIO packet in an order that the SRIO packets are received from each processing unit. Also, the SRIO switch reads SRIO packets from the region for "High" SRIO packets having the highest priority and transmits the SRIO packet to a destination. Subsequently, when the packet transmission of the region for the "High" SRIO packet is completed, the SRIO switch reads SRIO packets from a region for "Mid" SRIO packets having the next highest priority and transmits the SRIO packets to the destination. Thereafter, when the packet transmission of the region for the "Mid" SRIO packet is completed, the SRIO switch reads SRIO packets from a region for "Low" SRIO packets and transmits the SRIO packets to the destination.

See, for example, Japanese Patent Application Laid-Open No. 2010-218108 and Japanese Patent Application Laid-Open No. 2006-113798.

SUMMARY

A buffer control device according to one aspect of the present disclosure includes an acquisition unit which acquires predetermined information regarding data communication between a base station apparatus and external apparatuses other than the base station apparatus. The buffer control device predicts an amount of traffic in the data communication based on the acquired predetermined information. The buffer control device controls an occupation ratio of each of regions that are arranged in a buffer in association with a plurality of priorities, based on the predicted amount of traffic in the data communication, where the buffer stores pieces of data each of which is assigned one of the plurality of priorities and transmitted within the base station apparatus from a first processing unit to a second processing unit via a high speed serial interface.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of information stored in a weight table, according to an embodiment.

DESCRIPTION OF EMBODIMENTS

There is a problem that congestion occurs in the SRIO switch and thus, the communication speed is reduced in the technique described above.

For example, when a large number of SRIO packets having the "High" priority occur, the region for the "High" priority packets overflows and the SRIO packets stay in the SRIO switch. Therefore, a transmission delay or transmission error occurs and thus, the communication speed is reduced.

Hereinafter, descriptions will be made on exemplary embodiments of the buffer control device, the buffer control method and the base station apparatus disclosed in the present disclosure with reference to accompanying drawings. Further, the present disclosure is not limited to the exemplary embodiments.

Embodiment 1

[System Configuration]

Figure 1:
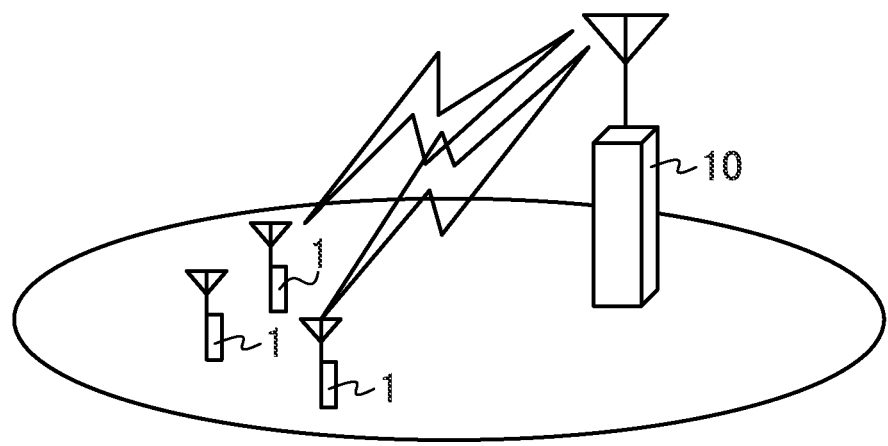
FIG. 1 is a diagram illustrating an example of an overall configuration of a wireless communication system, according to an embodiment.

FIG. 1 is a diagram illustrating an example of an overall configuration of a wireless communication system, according to an embodiment. As illustrated in FIG. 1, the wireless communication system includes a plurality of user terminals 1 and a base station apparatus 10.

Each user terminal 1 is a terminal device which performs a wireless communication with other user terminal 1 through the base station apparatus 10, and transmits and receives various control information to and from the base station apparatus 10. For example, the user terminal 1 is a portable phone, a smart phone, or a personal computer.

The base station apparatus 10 is an apparatus which performs various control regarding the wireless communication of the user terminal 1. For example, the base station apparatus 10 relays wireless communication between different user terminals 1, transmits various control information to the user terminals 1 and controls, for example, the handover of the user terminals 1.

[Hardware Configuration]

Figure 2:
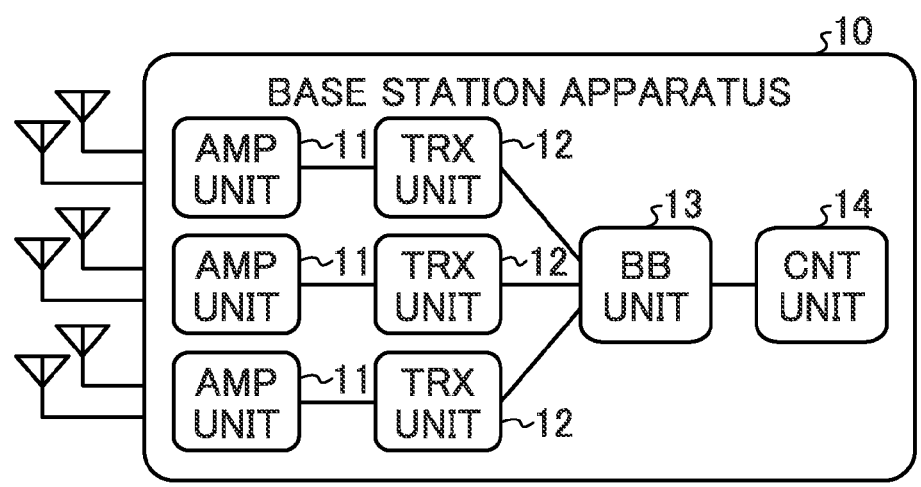
FIG. 2 is a diagram illustrating an example of a configuration of a base station apparatus, according to an embodiment.

FIG. 2 is a diagram illustrating an example of a configuration of a base station apparatus, according to an embodiment. As illustrated in FIG. 2, the base station apparatus 10 includes a plurality of AMP units 11, a plurality of TRX units 12, a BB unit 13, and a CNT unit 14. Further, the base station apparatus 10 may include processing units other than the processing units illustrated.

Each AMP unit 11 is a processing unit which performs power amplification on the wireless signal transmitted and received through an antenna coupled to each AMP unit 11. For example, each AMP unit 11 is implemented by, for example, an amplification circuit.

Each TRX unit 12 is a processing unit which performs analog to digital conversion or digital to analog conversion on the wireless signal. For example, each TRX unit 12 is implemented by, for example, a conversion circuit.

The BB unit 13 is a processing unit which performs a signal processing such as a base band processing, on the wireless signal. For example, the BB unit 13 is implemented by, for example, a DSP (Digital Signal Processor) or LSI. The processing units such as respective circuits are connected with each other via the SRIO in the BB unit 13.

The CNT unit 14 is a processing unit which performs, for example, an IP (Internet Protocol) layer protocol processing, call control processing, OAM (Operations Administration and Maintenance) processing, band control processing, collecting of a fault information, and monitoring of a device fault. For example, the CNT unit 14 is implemented by, for example, a CPU (Central Processing Unit) and the DSP.

[Hardware Configuration of BB Unit]

Figure 3:
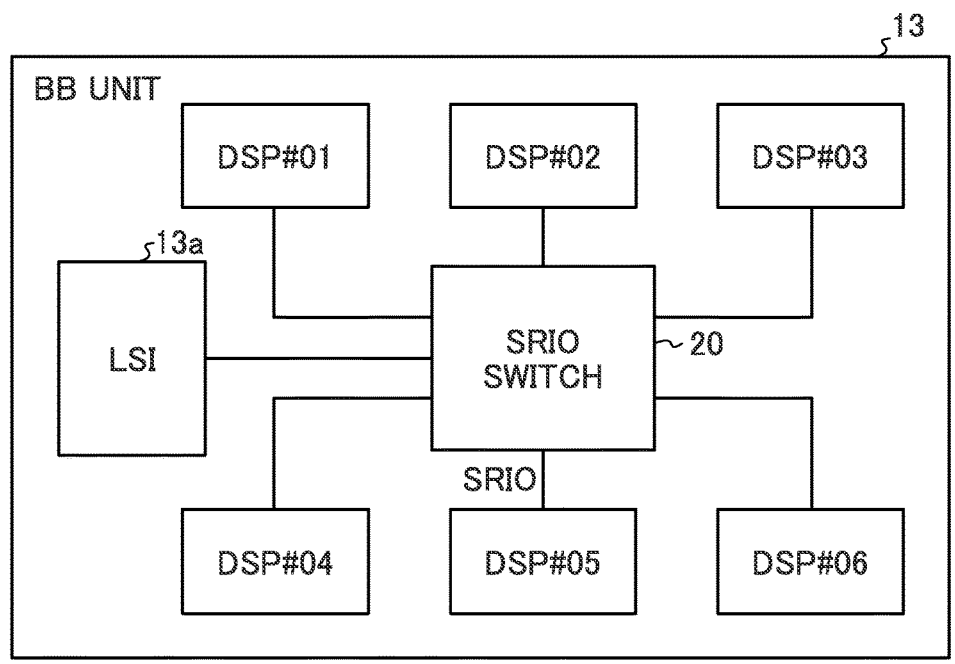
FIG. 3 is a diagram illustrating an example of a configuration of a BB unit of the base station apparatus, according to an embodiment.

FIG. 3 is a diagram illustrating a configuration example of a BB unit of a base station apparatus, according to an embodiment. As illustrated in FIG. 3, the BB unit 13 includes a LSI (Large Scale Integration) 13a, DSP #01 to DSP #06, and a SRIO switch 20, and respective processing units are connected with each other in a star shape centering on the SRIO switch 20.

The LSI 13a transmits and receives data between interfaces such as a RF (Radio Frequency) interface and a core network interface. Further, the LSI 13a transmits and receives data to and from the TRX unit 12. The LSI 13a communicates with each DSP through the SRIO switch 20.

Each DSP uses one or a plurality of DSPs to cause various processing units to be performed. Here, the processing units to be performed includes, for example, a layer 2 processing unit, an encoding unit, a modulating unit, a demodulating unit, a decoding unit, and a scheduler.

The layer 2 processing unit is a processing unit which performs processing for interfacing with the CNT unit 14 and performs various processing regarding layer 2. The processing performed in layer 2 includes processing regarding respective sub-layers, such as MAC (Media Access Control), RLC (Radio Link Control), and PDCP (Packet Data Convergence Protocol).

The encoding unit performs an encoding process, such as a turbo encoding, on data from the layer 2 processing unit. The modulating unit performs, on data from the encoding unit, a modulating process or a process for wireless transmission. The demodulating unit performs a demodulating process for data from the LSI 13a and a channel estimation process. The decoding unit performs a decoding process, such as a turbo decoding, on data from de-multiplexing unit. The scheduler performs a wireless bandwidth control or collecting of measured information.

The SRIO switch 20 is connected with each processing unit within the BB unit 13 via the SRIO to relay data communications within the BB unit 13 using the SRIO. For example, a buffer for transmission is installed at the transmission side in the SRIO switch 20 for each of priorities of the SRIO packet: "High", "Mid", and "Low".

Also, the SRIO switch 20 sequentially stores the SRIO packet in the corresponding region of a retransmission buffer corresponding to the priority of each SRIO packet, in an order that the SRIO packets are received from each processing unit. Also, the SRIO switch sequentially reads a SRIO packet from a region for the "High" priority which is the highest priority and transmits the SRIO packet to a destination.

[Configuration of SRIO Switch]

Figure 4:
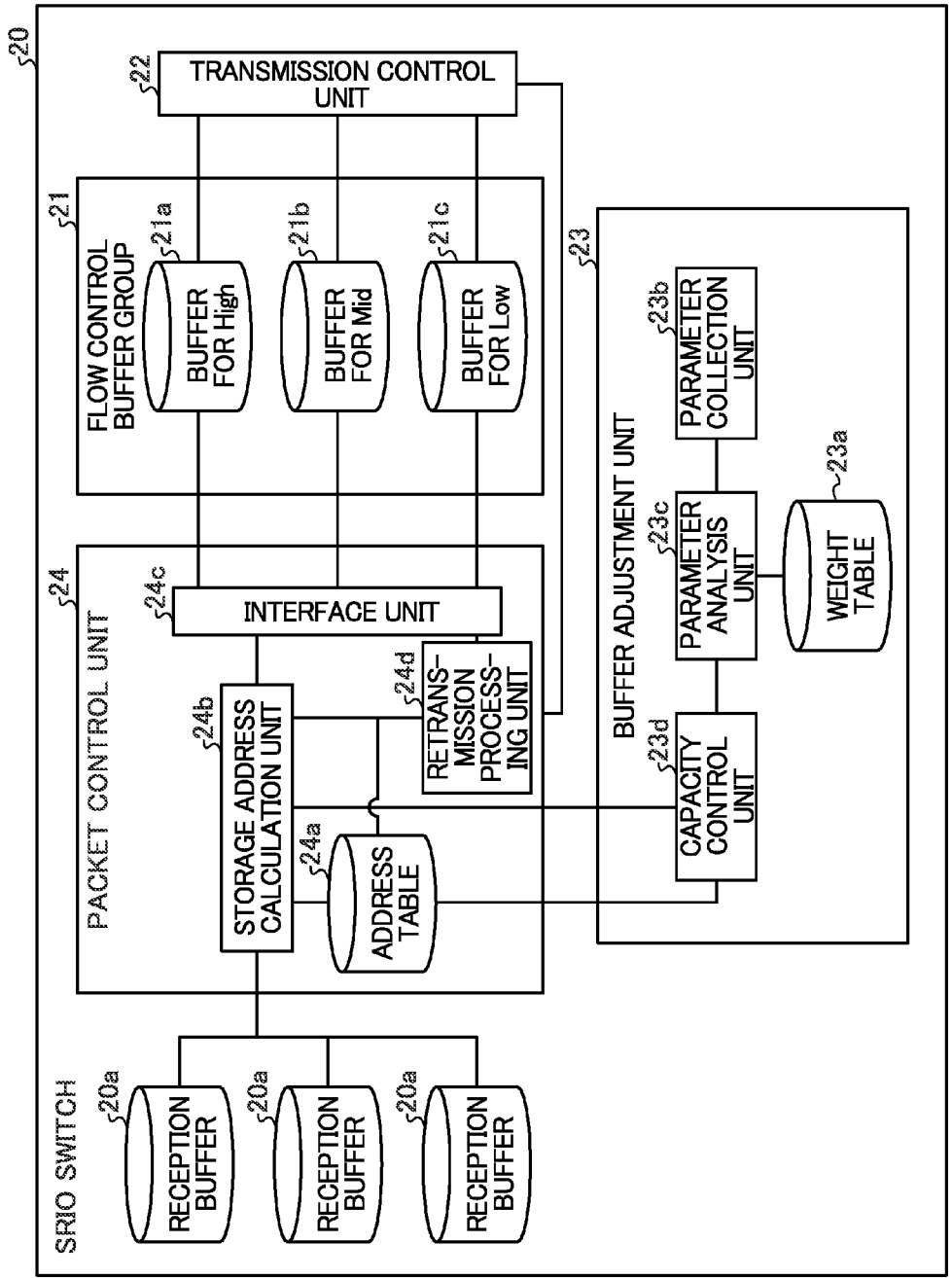
FIG. 4 is a diagram illustrating an example of a functional configuration of a SRIO switch, according to an embodiment.

FIG. 4 is a diagram illustrating an example of a functional configuration of a SRIO switch, according to an embodiment. As illustrated in FIG. 4, the SRIO switch 20 includes a plurality of reception buffers 20a, a flow control buffer group 21, a transmission control unit 22, a buffer adjustment unit 23, and a packet control unit 24.

Each reception buffer 20a is a buffer provided for each processing unit connected with the SRIO switch 20. For example, the encoding unit performed by DSP #01 writes, into the reception buffer 20a, the SRIO packet that is to be transmitted to the conversion unit performed by the DSP #02.

The flow control buffer group 21 maintains packets in buffers each of which is provided for each priority which is set for the SRIO packet. For example, the flow control buffer group 21 includes a buffer 21a for a "High" priority, a buffer 21b for a "Mid" priority, and a buffer 21c for a "Low" priority, and temporarily maintains the SRIO packet that is to be transmitted from a processing unit to the other processing unit in the BB unit 13.

The buffer 21a for the "High" priority maintains the SRIO packet for which the highest priority of "High" is set. The buffer 21b for the "Mid" priority maintains the SRIO packet for which the next highest priority of "Mid" is set. The buffer 21c for the "Low" priority maintains the SRIO packet for which the lowest priority of "Low" is set.

The transmission control unit 22 is a processing unit which reads a SRIO packet from the flow control buffer group 21 and transmits the SRIO packet to the processing unit of the destination. For example, the transmission control unit 22 reads a SRIO packet from the buffer 21a for the "High" priority to transmit the SRIO packet to the destination. Subsequently, when transmission of the packets stored in the buffer 21a for the "High" priority is completed, the transmission control unit 22 reads a SRIO packet from the buffer 21b for the "Mid" priority to transmit the SRIO packet to the destination. Thereafter, when transmission of the packets stored in the buffer 21b for the "Mid" priority packet is completed, the transmission control unit 22 reads a SRIO packet from the buffer 21c for the "Low" priority to transmit the SRIO packet to the destination.

Further, the transmission control unit 22 also performs a retransmission control of a SRIO packet. Specifically, the transmission control unit 22 performs the retransmission control when a transmission error occurs or a retransmission request is received from the processing unit of the reception side. For example, the transmission control unit 22 instructs the packet control unit 24 to store SRIO packets subsequent to the SRIO packet for which a transmission error has been occurred, and performs the retransmission of the SRIO packets.

The buffer adjustment unit 23 is a processing unit which predicts the amount of traffic for SRIO packets based on a parameter acquired in the base station apparatus 10 and dynamically controls a buffer amount, which is allocated for each priority, of a buffer included in the SRIO switch 20 based on the predicted value. The buffer adjustment unit 23 includes a weight table 23a, a parameter collection unit 23b, a parameter analysis unit 23c, and a capacity control unit 23d.

The weight table 23a stores a weight which is set for each parameter acquired in the base station apparatus 10. FIG. 5 is a diagram illustrating an example of information stored in a weight table, according to an embodiment. As illustrated in FIG. 5, the weight table 23a stores "number", "parameter factor and information", "weighting factor 1", and "weighting factor 2", in association with each other.

Here, the "number" to be stored is a number which indicates a priority level of the weighting factor 1. The "parameter factor and information" is information which specifies the parameter acquired in the base station apparatus 10. The "weighting factor 1" is information on weight set for the parameter and is used when controlling the buffer using the total weight. The "weighting factor 2" is information on weight set for the parameter and is used when separately controlling each of buffers.

In the example of FIG. 5, the number "10" and "1.5" are set for "the number of UEs (user terminals) that requests data communication" as the weighting factor 1 and the weighting factor 2, respectively. Further, the number "4" and "1.8" are set for the "data amount to be subjected to HO (handover)" as the weighting factor 1 and the weighting factor 2, respectively.

Further, any one of the priorities corresponds with each "parameter factor and information". For example, the weighting factor 1 and the weighting factor 2 for the "number" field having a value of 1 (one) and the "parameter factor and information" field having the content of "number of UEs requesting data communication" are weights given for the "High" priority. Further, the weighting factor 1 and the weighting factor 2 for the "number" field having a value of 2 (two) and the "parameter factor and information" field having the content of "whether UE currently performing the data communication exists and retransmission amount" are weights given for the "Mid" priority. Such a weight factor setting may be arbitrarily performed by a managing operator in accordance with the system.

The parameter collection unit 23b is a processing unit which collects parameters regarding the data communication between the base station apparatus 10 and an external apparatus other than the base station apparatus. For example, the parameter collection unit 23b collects respective parameters illustrated in FIG. 5 from each processing unit that is connected with the SRIO switch 20 via a dedicated line, and outputs the collected results to the parameter analysis unit 23c. In the case, the collection timing may be set arbitrarily, for example, at regular time intervals or at the timing designated by the managing operator.

The parameter analysis unit 23c is a processing unit which predicts the amount of traffic of the data communication between the base station apparatus 10 and an external apparatus other than the base station apparatus 10, based on the parameters collected by the parameter collection unit 23b. An example for which the weighting factor 1 illustrated in FIG. 5 is used will be described. The parameter analysis unit 23c refers to the weighting factor 1 of the weight table 23a to specify weight for each parameter collected by the parameter collection unit 23b.

Also, the parameter analysis unit 23c calculates the total weight of the weighting factors 1 for each of priorities: "High", "Mid", and "Low". Thereafter, the parameter analysis unit 23c calculates a ratio or relative value of each priority from the calculated total weights of weighting factors for the respective priorities. For example, when the total weight for the "High" priority is 50 (fifty), the total weight for the "Mid" priority is 20 (twenty), and the total weight for the "Low" priority is 30 (thirty), the parameter analysis unit 23c determines that the ratio of priorities is "High:Mid:Low=5:2:3". Also, the parameter analysis unit 23c outputs, for example, the calculated ratio to the capacity control unit 23d.

The capacity control unit 23d is a processing unit which controls a capacity of each buffer of the flow control buffer group 21. For example, the capacity control unit 23d adjusts the buffer capacity to be allocated for each buffer within the entire capacity of the flow control buffer group 21, based on the information notified from the parameter analysis unit 23c.

For example, in the case of using the weighting factor, the capacity control unit 23d receives information of "High:Mid:Low=5:2:3" from the parameter analysis unit 23c in a state where the entire capacity of the flow control buffer group 21 is "500 MB (megabyte)". In this case, the capacity control unit 23d adjusts the capacity of the buffer 21a for the "High" priority to become "500×5/10=250 MB". Similarly, the capacity control unit 23d adjusts the capacity of the buffer 21b for the "Mid" priority and the capacity of the buffer 21c for the "Low" priority to become "500×2/10=100 MB" and "500×3/10=150 MB", respectively.

Here, a method which changes an address of each buffer for storing the SRIO packet may be used as an adjustment method. For example, the capacity control unit 23d rewrites a start address and an end address into the address table 24a according to the adjusted capacity to adjust the buffer amount of each buffer allocated for each priority.

Figure 6:
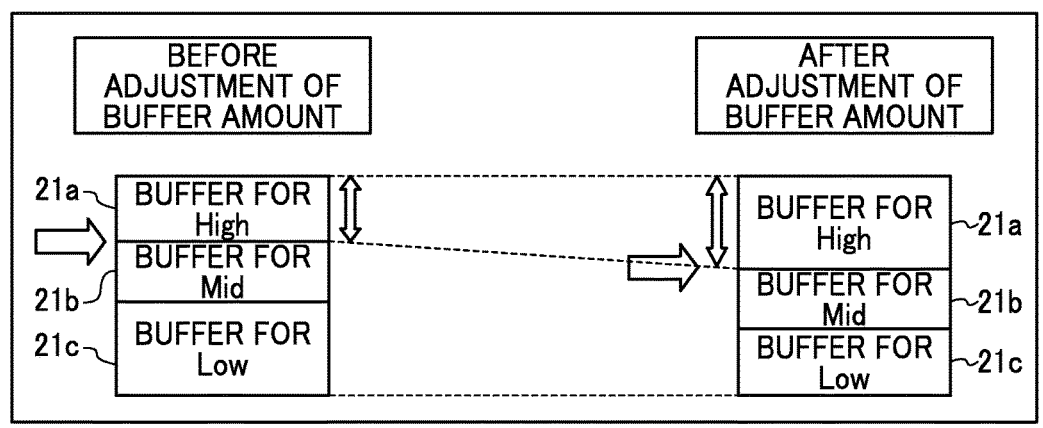
FIG. 6 is a diagram illustrating an example of change in buffer capacity, according to an embodiment.

FIG. 6 is a diagram illustrating an example of a change in buffer capacity, according to an embodiment. As illustrated in FIG. 6, the capacity control unit 23d adjust the buffer capacity of each buffer for each priority, by changing the ratio of the buffer capacity to be allocated to each buffer for each priority without changing the total capacity of the entire buffer. The example of FIG. 6 illustrates an example in which the capacity control unit 23d makes the ratio of buffer 21a for the "High" priority larger and does not change the ratio of buffer 21b for the "Mid" priority, and makes the ratio of buffer 21b for the "Low" priority smaller.

Further, the capacity control unit 23d may compare the buffer capacity after adjustment with the current buffer capacity in order to calculate an increase/decrease value of each priority, and adjust the buffer amount of each buffer for each priority based on the calculated increase/decrease value.

The packet control unit 24 includes an address table 24a, a storage address calculation unit 24b, an interface unit 24c, and a retransmission processing unit 24d, and is a processing unit which controls the packet transmission using these components.

The address table 24a is a table which stores an address of the flow control buffer group 21 for storing SRIO packets. For example, the address table 24a stores start and end addresses of each buffer in association with the each buffer. Here, the information stored in the address table is rewritten by the capacity control unit 23d.

The storage address calculation unit 24b is a processing unit which calculates, for each reception buffer 20a, the address of the flow control buffer corresponding to the priority set for the received SRIO packet, at which the SRIO packet is to be stored, based on the address table 24a. The storage address calculation unit 24b outputs the calculated address information and the received SRIO packet to the interface unit 24c.

The interface unit 24c is a processing unit which stores the received SRIO packet in a designated location of the buffer corresponding to a designated priority. For example, the interface unit 24c stores the received SRIO packet using the address of the flow control buffer group for storing the SRIO packet, received from the storage address calculation unit 24b.

For example, when an address of "0x0012" is designated from the storage address calculation unit 24b, the interface unit 24c write the received SRIO packet into the flow control buffer by designating the address "0x0012" for the flow control buffer group 21. As a result, the interface unit 24c may store the SRIO packet in a region of the buffer corresponding to the priority designated for the SRIO packet.

The retransmission processing unit 24d is a processing unit which performs retransmission of a SRIO packet. For example, when a retransmission request for the SRIO packet after the SRIO packet for which the transmission error has been occurred is received from the transmission control unit 22, the retransmission processing unit 24d performs the retransmission of SRIO packets subsequent to the SRIO packet for which the retransmission is requested.

[Process Flow]

Next, an operational flowchart for processes performed by the SRIO switch 20 will be described. Here, overall process flow, a buffer amount adjustment process, and a process for storing the SRIO packet into the buffer will be described.

(Overall process)

Figure 7:
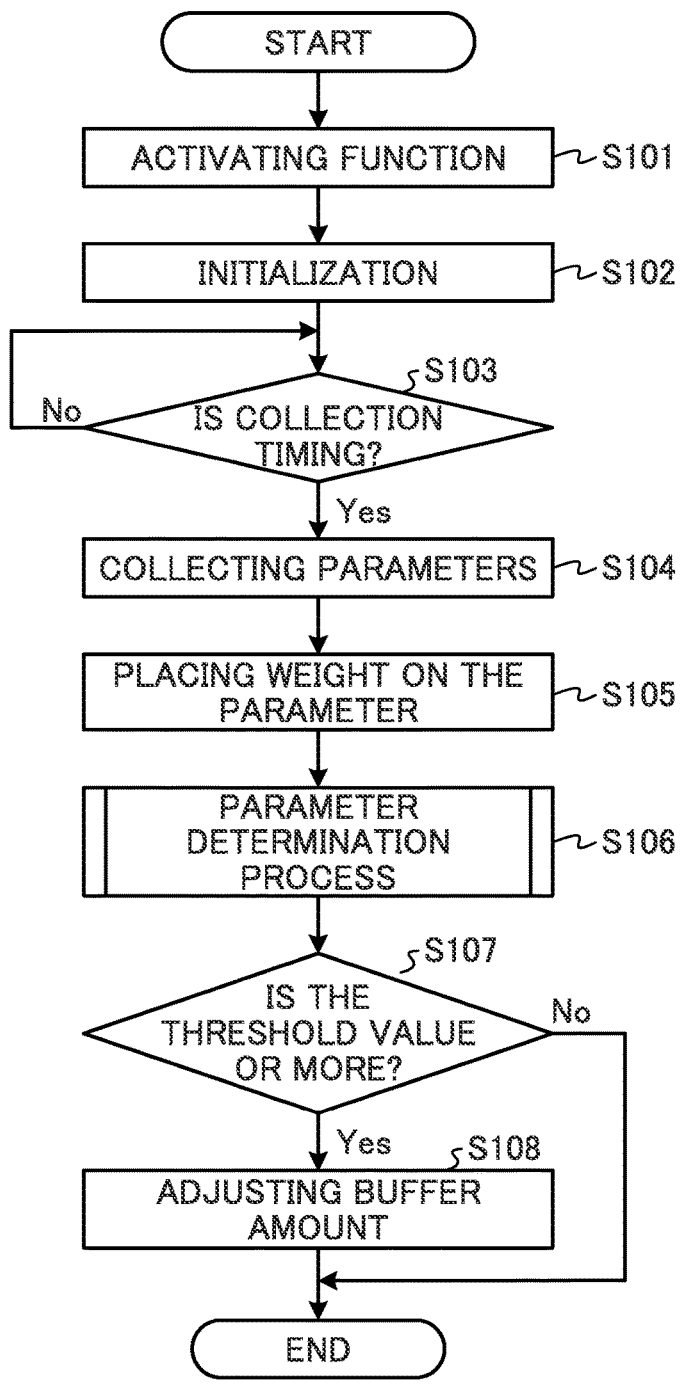
FIG. 7 is a diagram illustrating an example of an operational flowchart for entire process executed by the SRIO switch, according to an embodiment.

FIG. 7 is a diagram illustrating an operational flowchart for entire process executed by a SRIO switch, according to an embodiment. As illustrated in FIG. 7, when power is turned ON, the SRIO switch 20 activates the buffer amount adjustment function (S101) and performs initialization (S102).

Thereafter, when a parameter collection timing arrives ("YES" at S103), the parameter collection unit 23b collects parameters (S104). Subsequently, the parameter analysis unit 23c refers to the weight table 23a to place weight on the collected parameter (S105).

Also, the parameter analysis unit 23c performs a parameter determination process which calculates, for example, weight on each priority or a ratio of each priority using the weighting factor 1 or weighting factor 2 of the parameter (S106). Thereafter, when the parameter corresponding to each priority is equal to or greater than a threshold value serving as a reference value for determining whether a buffer capacity is required to be changed ("YES" at S107), the capacity control unit 23d changes the buffer capacity for the corresponding priority (S108). Further, when the parameter corresponding to each priority is less than the threshold value serving as the reference value for determining whether the buffer capacity is required to be changed ("NO" at S107), the capacity control unit 23d ends the process.

(Adjustment Process)

Figure 8:
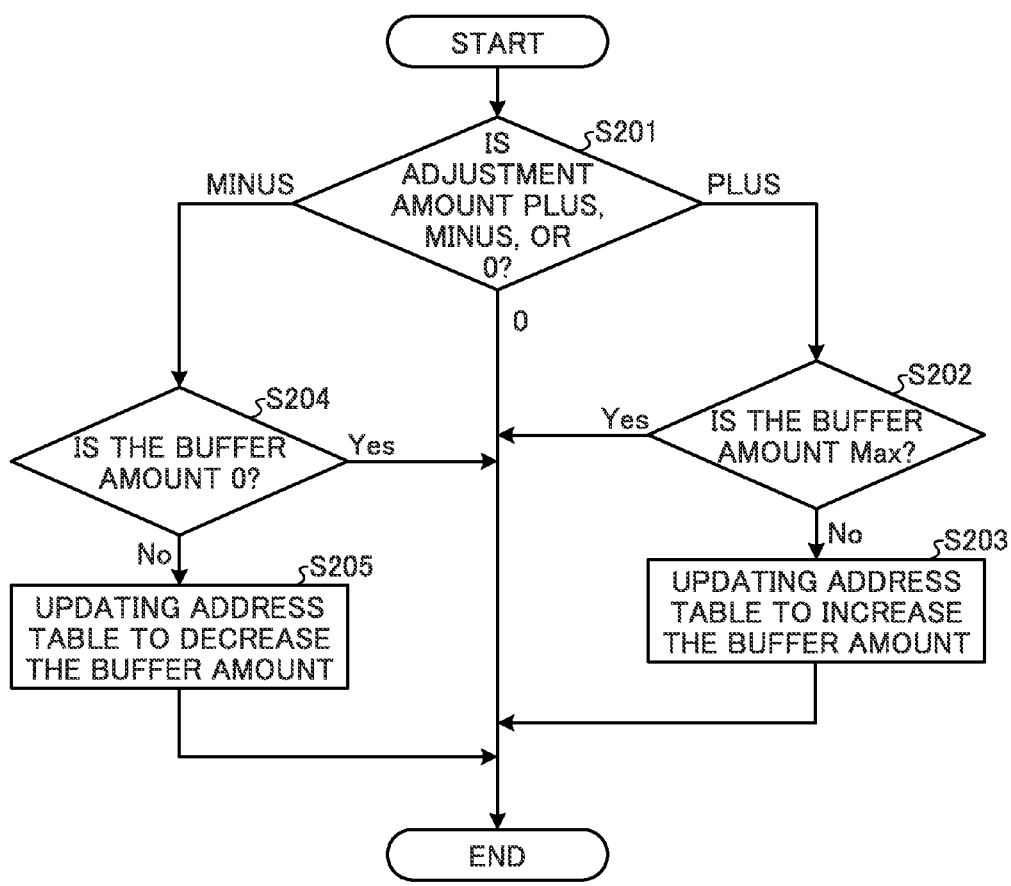
FIG. 8 is a diagram illustrating an example of an operational flowchart for a process of adjusting a buffer amount, according to an embodiment.

FIG. 8 is a diagram illustrating an example of an operational flowchart for an adjusting process of a buffer amount, according to an embodiment. As illustrated in FIG. 8, the capacity control unit 23d determines whether an adjustment amount is a positive value, negative value, or zero for each priority using a parameter or weight analysis result by the parameter analysis unit 23c (S201).

When it is determined that the adjustment amount is a positive value ("PLUS" at S201), the capacity control unit 23d determines whether the current buffer amount of all the flow control buffer group 21 is the maximum value (Max) (S202). When it is determined that the current buffer amount of all the flow control buffer group 21 is not the Max value ("NO" at S202), the capacity control unit 23d updates the address for storing the SRIO packet stored in the address table 24a so as to increase the buffer amount according to the adjustment amount (S203). Further, when the adjustment amount is a positive value ("PLUS" at S201) and it is determined that the current buffer amount is the Max value ("YES" at S202), the capacity control unit 23d ends the process.

In the meantime, when it is determined that the adjustment amount is a negative value ("MINUS" at S201), the capacity control unit 23d determines whether the current buffer amount of all flow control buffer group 21 is zero (S204). When it is determined that the current buffer amount of all the flow control buffer group 21 is not zero ("NO" at S204), the capacity control unit 23d updates an address for storing the SRIO packet stored in the address table 24a so as to decrease the buffer amount according to the adjustment amount (S205). Further, when the adjustment amount is the negative value ("MINUS" at S201) and it is determined that the current buffer amount is zero ("0" at S201), the capacity control unit 23d ends the process.

(Storing Process)

Figure 9:
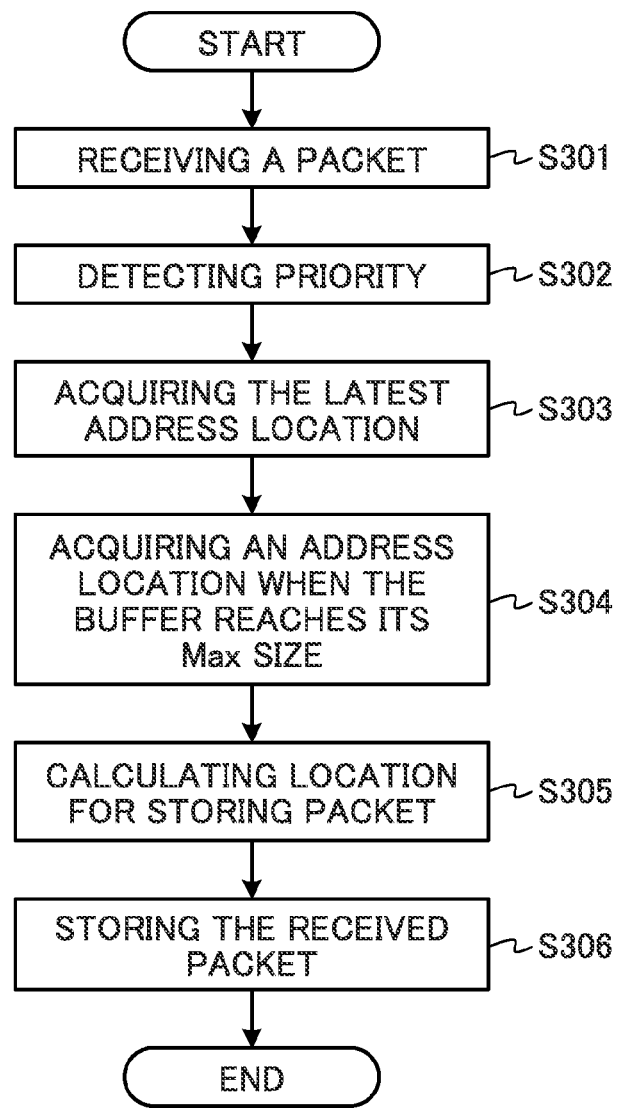
FIG. 9 is a diagram illustrating an example of an operational flowchart for a process of storing a packet into a buffer, according to an embodiment.

FIG. 9 is s diagram illustrating an example of an operational flowchart for storing a packet into a buffer, according to an embodiment. As illustrated in FIG. 9, when the SRIO packet is received (S301), the storage address calculation unit 24b detects the priority of the received packet (S302).

Subsequently, the storage address calculation unit 24b refers to the address table 24a to acquire the latest address location corresponding to the detected priority (S303) and further, acquires an address location when the buffer reaches its maximum size (S304).

Thereafter, the storage address calculation unit 24b calculates the location for storing the received SRIO packet in a range spanning from the latest location to the maximum address location (S305). The interface unit 24c stores the received SRIO packet into the calculated location for storing the SRIO packet (S306).

Specific Example

Next, a specific example in which the buffer capacity is changed using the parameter is described. Here, as an example, the buffer control illustrated in FIG. 5 using "the number of user terminals that request data communication", the buffer control using the "retransmission amount of the downstream data" and an example of performing change of buffer capacity using the weighting factor 2 of FIG. 5 will be described.

(Calculation of Number of User Terminals)

First, an example of extracting the number of user terminals which request data communication as the parameter will be described. When the user terminal 1 establishes connection or performs resynchronization with the base station apparatus 10 by, for example, originating a call or handover, a random access procedure is performed. In the random access procedure, a channel used at first for transmitting a preamble is called a Physical Random Access Channel (PRACH).

Figure 10:
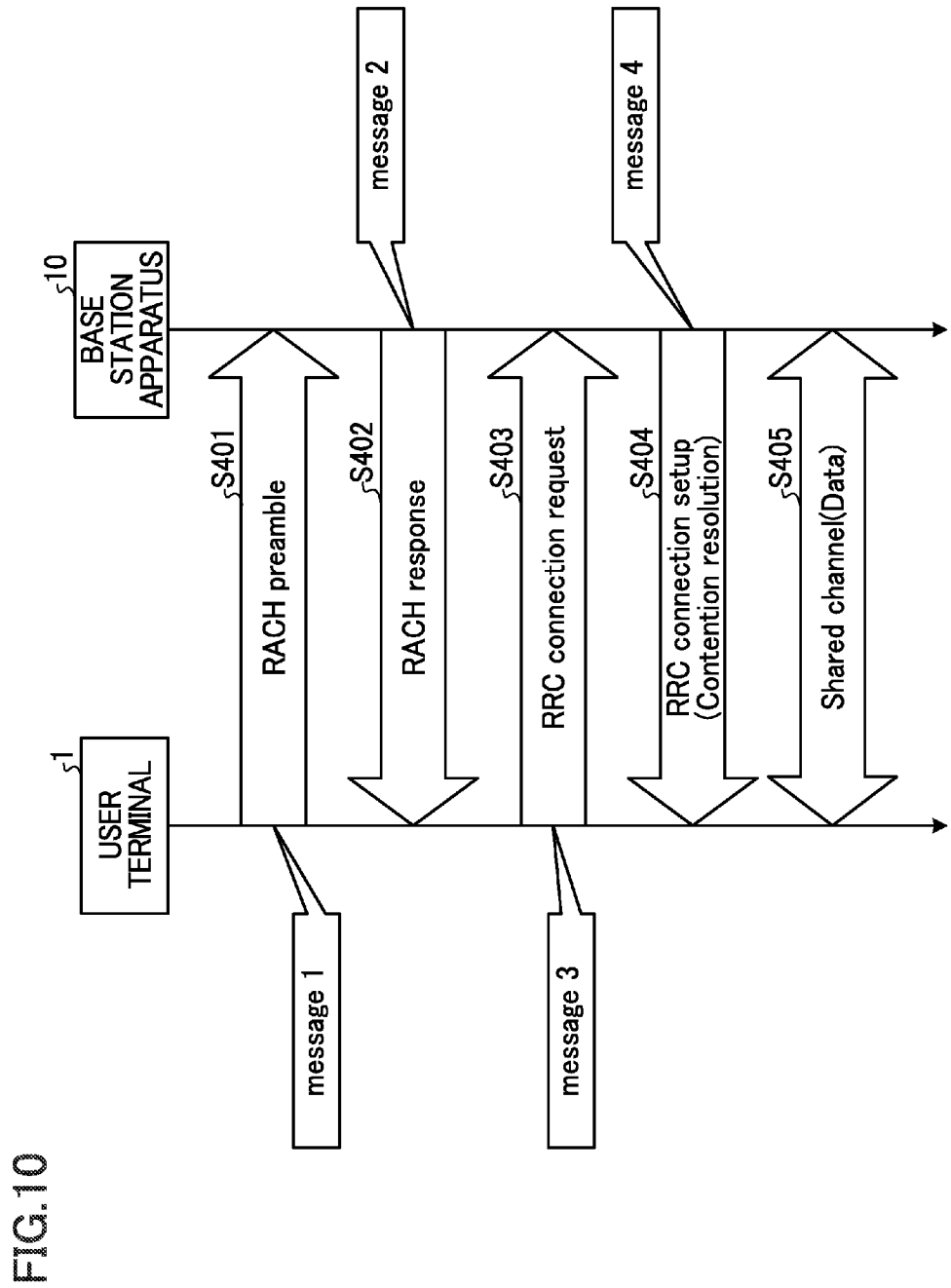
FIG. 10 is a diagram illustrating an example of an operational sequence for a random access procedure at the time of originating a call, according to an embodiment.

FIG. 10 is a diagram illustrating an example of a random access procedure at the time of originating a call, according to an embodiment. The user terminal 1 transmits a preamble, which is selected randomly from a plurality of preambles prepared in a cell, as message 1 (S401). When the preamble is detected, the base station apparatus 10 transmits RACH response, which is acknowledgement information, as message 2 (S402).

The user terminal 1 which has received the RACH response transmits RRC (Radio Resource Control) connection request, which is a connection request signal, as message 3 (S403). The base station apparatus 10 transmits RRC connection setup, which contains cell setting information for establishing a connection, as message 4 after receiving message 3 (S404). Thereafter, when an UE ID of the user terminal 1 is included in message 4, the user terminal 1 completes the random access procedure to establish a connection (S405).

The parameter collection unit 23b of the base station apparatus 10 monitors the number of connections, which is established using message 4 of the random access procedure performed at the time of originating a call, for example, every 10 ms. Also, the number of user terminals that request the data communication is calculated by, for example, a scheduler (not illustrated) and transmitted to the buffer adjustment unit 23. Monitoring of the number of established connections and the number of user terminals will be described with reference to FIG. 11.

Figure 11:
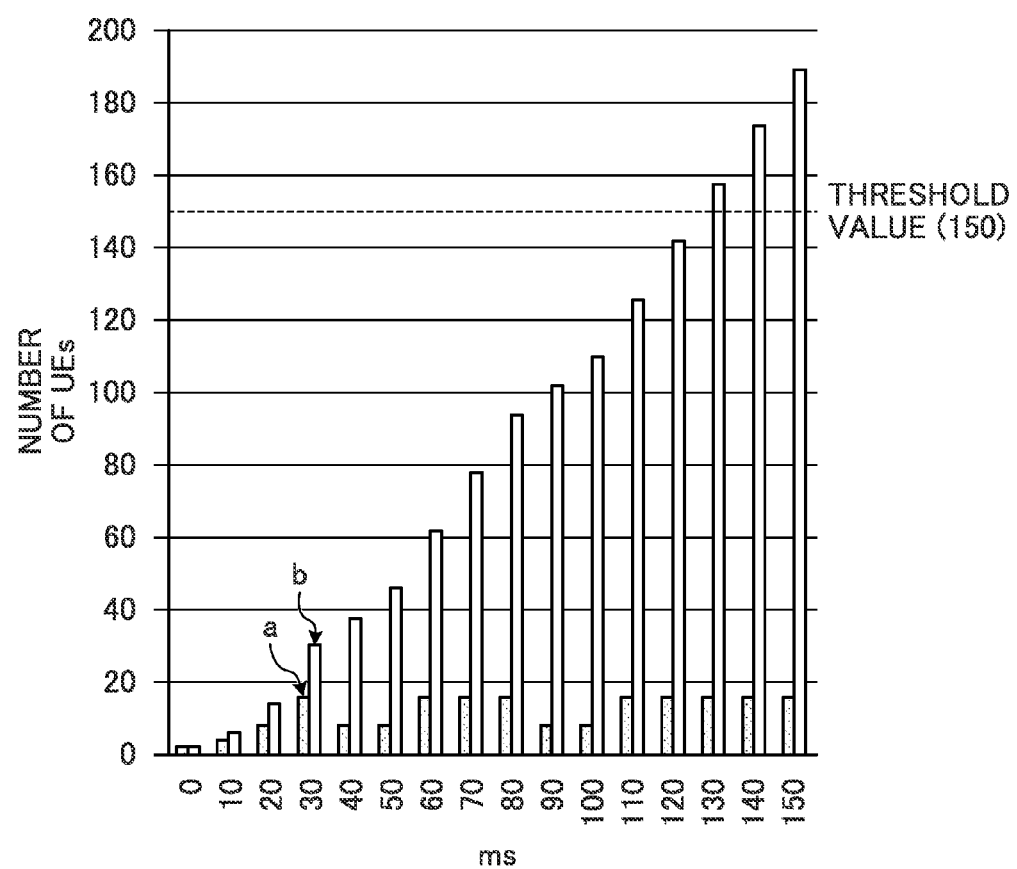
FIG. 11 is a diagram illustrating an example of change in the number of user terminals requesting data communication, according to an embodiment.

FIG. 11 is a diagram illustrating an example of a change in the number of user terminals that request data communication, according to an embodiment. FIG. 11 is a graph illustrating the result of monitoring the number of connections established using message 4 for every 10 ms interval. The numeral "a" of FIG. 11 indicates the number of messages 4 explained with reference to FIG. 10 and the numeral "b" of FIG. 11 indicates the number of user terminals that request the data communication. The parameter collection unit 23b of the buffer adjustment unit 23 monitors the received "number of user terminals that request data communication". Also, for example, when the number of user terminals exceeds a threshold value (e.g., 150), the parameter analysis unit 23c places weight on the parameter.

As described above, the base station apparatus 10 accepts 10 user terminals in average in the RACH procedure operated at every 10 ms interval. Accordingly, in a case where the number of user terminals reaches 150, for example, when the maximum number of user terminals within a coverage cell is set as 600, the number of user terminals exceeds about 25% of the maximum number "600". Therefore, it may be assumed that control information within the BB unit 13 increases and the number of SRIO packets having "High" priority increases.

(Calculation of Retransmission Amount)

Figure 12:
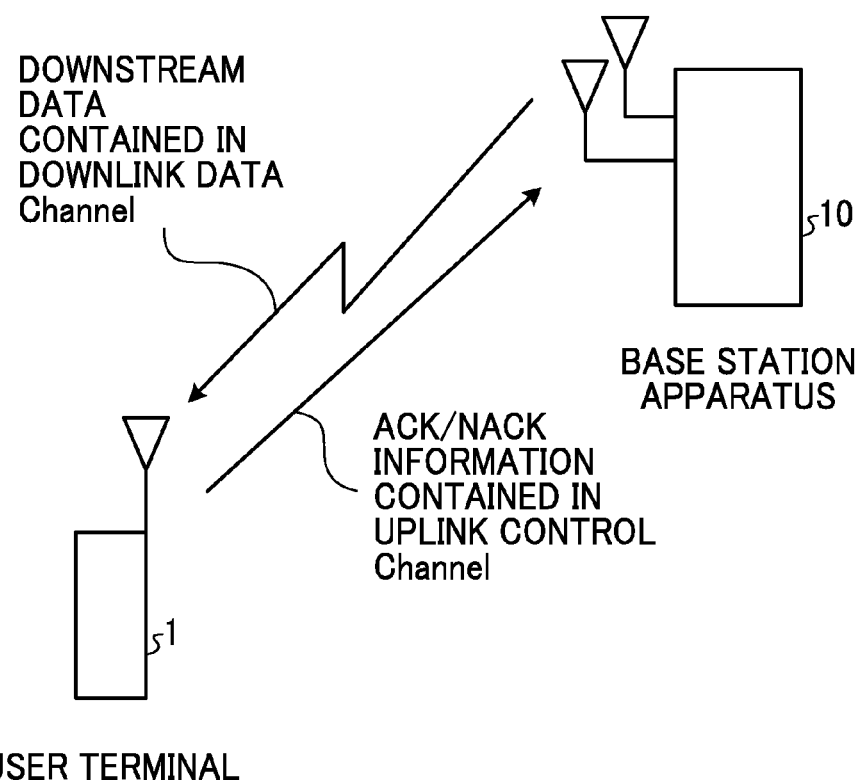
FIG. 12 is a diagram illustrating an example of a process of retransmitting downstream data, according to an embodiment.

Next, an example of extracting the retransmission amount of downstream data as a parameter will be described. FIG. 12 is a diagram illustrating an example of a retransmitting process of downstream data, according to an embodiment. As illustrated in FIG. 12, the base station apparatus 10 transmits the downstream transmission data to the user terminal 1 in a downlink data channel.

The user terminal 1 transmits information as to whether data to be received is arrived, to the base station apparatus 10, using ACK/NACK information transmitted in a uplink control channel. When the NACK indicating that the data to be received is not arrived is received, the base station apparatus 10 retransmits the downstream data to the user terminal 1 which is a NACK transmission source.

Figure 13:
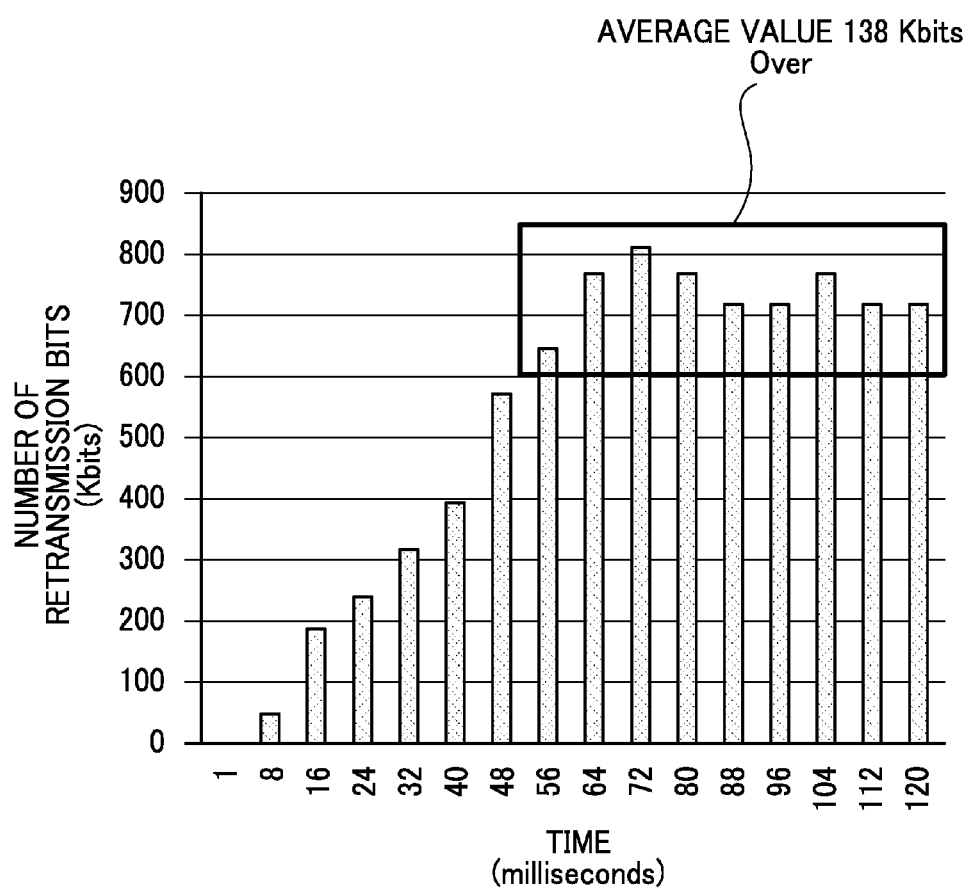
FIG. 13 is a diagram illustrating an example of change in a retransmission amount of downstream data, according to an embodiment.

Here, the scheduler within the BB unit 13 may calculate the retransmission amount of the user terminal which is performing data communication, based on the ACK/NACK information extracted from the uplink control channel at the encoding unit within the BB unit 13. FIG. 13 is a diagram illustrating change of the retransmission amount of the downstream data.

FIG. 13 is a diagram illustrating an example of change in the number of retransmission bits measured by counting the number of bits retransmitted at an interval of 8 (eight) milliseconds. As illustrated in FIG. 13, the number of retransmission bits is increasing as time elapses. Also, the number of retransmission bits increases continuously until the time reaches 56 milliseconds and exceeds the threshold value after 56 milliseconds. As described above, while a state of exceeding the threshold value 600 Kbits is continued, parameters are collected by the parameter collection unit 23b and a determination is made by placing weight on the parameters. Since the retransmission is performed every 8 (eight) milliseconds, the threshold value may be regarded as "75 Kbits×8 (milliseconds)=600 Kbits" which corresponds to a value for a case where 75 Kbits, which are 50% of 150 Kbits which are the maximum number of transmission bits, are retransmitted in the duration of 1 (one) millisecond. Since data to be transmitted increases when the retransmission amount of the user terminals performing data communication is increased, it may be assumed that the number of SRIO packets having the priority of "Mid" also increases.

(Buffer Control)

The parameter collection unit 23b collects the number of user terminals that request the data communication and the retransmission amount of downstream data, as illustrated in FIG. 11 or FIG. 13. In the embodiment, a ratio of the number of user terminals requesting the data communication to the threshold value of "150" is 26% or more, and a ratio of the value "138 Kbits", which is the average value of the number of retransmission bits exceeding the threshold value of "600", to the threshold value of "600" is 23% or more.

Here, as an example, since control information used for "the number of user terminals requesting data communication" is a direct factor of increasing the number of packets having the "High" priority, the parameter analysis unit 23c refers to the field of weighting factor 2 of FIG. 5 to acquire "1.5" as the weighting factor 2. Then, the parameter analysis unit 23c multiplies 26% by 1.5 using the weighting factor 2 of "1.5", thereby obtaining "0.4≈(0.26×1.5)".

Further, since the "retransmission amount of downstream data" becomes a direct factor of increasing the amount of data in an individual channel, the parameter analysis unit 23c refers to the field of weighting factor 2 of FIG. 5 to acquire "1.5" as the weighting factor 2. Then, the parameter analysis unit 23c multiplies 23% by 1.5 times using the weighting factor 2 of "1.5", thereby obtaining "0.3≈(0.23×1.5)".

Further, as an example, it is assumed that the entire capacity of the buffer is 9 Kbytes, and 3 Kbytes is allocated to each region of the buffers for the "High", "Mid", and "Low" priorities. Then, since "the number of user terminals requesting data communication" affects the "High" priority, the parameter analysis unit 23c calculates "3 Kbytes×(1.0+0.4)=4.2 Kbytes" as the capacity of the buffer 21a for the "High" priority.

Further, since "the retransmission amount of downstream data" affects the "Mid" priority, the parameter analysis unit 23c calculates "3 Kbyte×(1.0+0.3)=3.9 Kbytes" as the capacity of the buffer 21b for the "Mid" priority.

Also, the parameter analysis unit 23c calculates "9.0−4.2−3.9=0.9 Kbyte" as the capacity of the buffer 21c for the "Low" priority.

Figure 14:
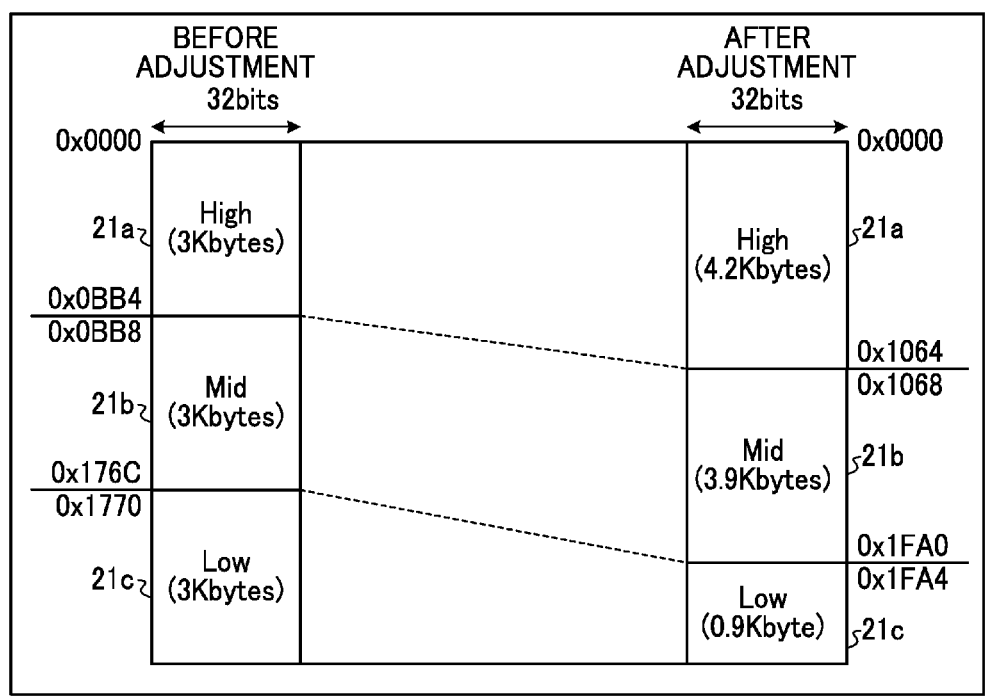
FIG. 14 is a diagram illustrating an example of buffer control, according to an embodiment.

The capacity control unit 23d updates the address table 24a by using the calculation results. FIG. 14 is a diagram illustrating an example of buffer control, according to an embodiment. As illustrated in FIG. 14, before adjustment of the buffer capacity, a region of "0x0000-0x0BB4" corresponds to the buffer 21a for the "High" priority, a region of "0x0BB8-0x176C" corresponds to the buffer 21b for the "Mid" priority, and a region of "0x1770-lowest address" corresponds to the buffer 21c for the "Low" priority.

In this state, with respect to the buffer 21a for the "High" priority, the capacity control unit 23d increases the capacity of the buffer 21a for the "High" priority to 4.2 Kbytes by rewriting the address table 24a so that the highest address-the lowest address for the "High" priority is changed from "0x0000-0x0BB4" into "0x0000-0x1064".

Similarly, with respect to the buffer 21b for the "Mid" priority, the capacity control unit 23d rewrites the address table 24a so that the highest address-the lowest address for the "Mid" priority is changed from "0x0BB8-0x176C" into "0x1068-0x1FA0", thereby increasing the capacity of the buffer 21b for the "Mid" priority to 3.9 Kbytes.

Further, with respect to the buffer 21c for the "Low" priority, the capacity control unit 23d rewrites the address table 24a so that the start location is changed from "0x1770" to "0x1FA4", thereby decreasing the capacity of the buffer 21c for the "Low" priority to 0.9 Kbyte. In a way described above, the capacity control unit 23d dynamically changes each buffer capacity using various parameters without changing the total capacity of respective buffers.

Conventionally, the flow control buffer within the SRIO switch 20 determines the buffer amount systematically. The flow control buffer divides a single buffer into regions corresponding to respective priorities, and determines a buffer amount for each priority so that the buffer amount takes a value between the average value and the maximum value of an amount of data transfer. Therefore, a larger size of buffer has been prepared for each priority.

However, there are few cases where the used amounts of respective buffers for "High" and "Mid" priorities become the maximum values at one time. Further, even when the used amounts of the respective buffers for "High" and "Mid" priorities become the maximum values at one time due to utilization of the scheme of the embodiment, the capacity of the buffer 21c for the "Low" priority may be made smaller, thereby allowing the SRIO packet having the "High" priority to be preferentially transmitted. Therefore, a buffer space for each priority may be efficiently used and thus the entire buffer amount may be reduced to achieve cost reduction.

Conventionally, when retransmission request occurs, data are retransmitted and the power consumption is increased. However, with the scheme of the embodiment, the ratio of the amount of the flow control buffer to be used for each priority to the total amount of the flow control buffer may be changed depending on the traffic amount. Therefore, the occurrence of retransmission processing may be reduced and the power consumption may be reduced accordingly.

Conventionally, since the internal operation timing of the BB unit 13 is prescribed by taking into account the occurrence of retransmission, timings including an operating margin are set for respective processing units. However, the scheme of the embodiment allows the ratio of occurrence of retransmission to be lowered, thereby reducing the operating margin. Therefore, an enough processing time is allowed and performance of the BB unit 13 is improved, thereby increasing the number of users available for data communication.

Embodiment 2

While the embodiment of the present disclosure has been described, the present disclosure may be practiced in various shapes in addition to the embodiment described above. Therefore, other embodiments will be described below.

(Buffer Adjustment Unit)

In Embodiment 1, an example in which the buffer adjustment unit 23 is equipped in the SRIO switch 20 is described, but the present disclosure is not limited thereto. For example, the buffer adjustment unit 23 may be installed outside of the SRIO switch 20. In this case, the buffer adjustment unit 23 is implemented by, for example, a DSP connected with the SRIO switch 20.

(Retransmission Control)

For example, it is assumed that, in a case where each buffer capacity is fixed, a large number of the SRIO packets having the "High" priority are generated ant a buffer overflow has been occurred. In this case, retransmissions of the SRIO packets occur and the SRIO packets to be retransmitted are accumulated in the SRIO switch. Therefore, the SRIO packets having the "High" priority generated successively stay in the SRIO switch without being transmitted. As a result, the SRIO switch fails to exhibit inherent performance and the communication speed is reduced. Further, power consumption also increases as the occurrence of retransmission increases.

According to the embodiment, it is possible to detect increase in the number of the SRIO packets having the "High" priority and to increase the buffer capacity for the "High" priority. Therefore, the occurrence of buffer overflow as well as retransmission of packets may be suppressed. Further, suppression of retransmission allows suppression of power consumption.

(System)

Further, some or all of processes described as being automatically performed among respective processes described in the embodiment may be manually performed. Meanwhile, some or all of processes described as being manually performed among the respective processes may be automatically performed using a known method. In addition, information including a processing sequence, control sequence, specific name, various data or parameters illustrated in the specification or accompanying drawings may be arbitrarily changed unless otherwise noted.

Further, each component of each device illustrated is a functional and conceptual device and does not necessarily need to be configured in accordance with a physical configuration as illustrated. That is, a specific shape of distribution or integration of respective devices is not limited to a shape illustrated. That is, some or all of devices may be configured by being functionally and physically distributed or integrated in any basic functional unit depending on, for example, various load or use situations. Further, some or all of respective processing functions performed by respective devices may be implemented by a CPU or program analyzed and executed by the CPU, or hardware configured by wired-logic.

As an example, the base station apparatus 10 stores the buffer control program, which performs various processing of the transmission control unit 22, the buffer adjustment unit 23, and the packet control unit 24, in a ROM (Read Only Memory) and reads out, from the ROM, the buffer control program so as to be executed by, for example, the CPU. Also, the base station apparatus 10 may cause the buffer control process to perform a control similar to that performed by the transmission control unit 22, the buffer adjustment unit 23, and the packet control unit 24.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus comprising:
a buffer comprising a plurality of regions, wherein each region in the buffer is designated by one of a plurality of priorities; and
a buffer control device connected to the buffer and including
a processor configured to:
acquire predetermined information regarding data communication between the base station apparatus and external apparatuses other than the base station apparatus;
predict a first amount of traffic in the data communication based on the acquired predetermined information;
determine an occupancy ratio for the plurality of regions in the buffer based on the predicted first amount of traffic in the data communication; and
store by the buffer in a respective designated region, in accordance with the determined occupancy ratio, first pieces of data each of which is assigned one of the plurality of priorities and transmitted within the base station apparatus from a first processing unit to a second processing unit via a high speed serial interface;
wherein the occupancy ratio represents a relationship between a storage capacity of one of the plurality of regions in the buffer to each storage capacity of remaining plurality of regions in the buffer.

2. The base station apparatus of claim 1, wherein
the processor is further configured to, when it is predicted that a second amount of traffic for second pieces of data having a predetermined priority increases to a threshold value or more, increase an occupancy ratio of a region of the buffer, in which the second pieces of data are to be stored, to a adjusted ratio.

3. The base station apparatus of claim 1, wherein
the processor is further configured to predict that a second amount of traffic for second pieces of data having a high priority increases to a predetermined value or more when a number of the external apparatuses that request the data communication from the base station apparatus becomes a predetermined number or more; and
the processor is further configured to increase an occupancy ratio of a region of the buffer allocated to the second pieces of data having the high priority, to a adjusted ratio when it is predicted that the second amount of traffic increases to the predetermined value or more.

4. The base station apparatus of claim 1, wherein
the processor is further configured to predict that, among high, middle, and low priorities, a second amount of traffic for second pieces of data having the middle priority increases to a predetermined value or more when an amount of retransmission of the external apparatuses performing the data communication becomes a predetermined number of packets or more; and
the processor is further configured to make a region allocated to the second pieces of data having the middle priority, larger than regions of other priorities in the buffer when it is predicted that the second amount of traffic increases to the predetermined number of packets or more.

5. The base station apparatus of claim 1, wherein
the plurality of priorities includes a first priority and a second priority lower than the first priority,
the first amount is amount of a first traffic that has the first priority, the first amount of the first traffic being predicted based on a number of the wireless terminals that request the data communication with the base station apparatus,
the processor is configured to predict a second amount of a second traffic that has the second priority in the data communication based on the acquired predetermined information, the second amount of the second traffic being predicted based on an amount of retransmission of the data communication between the base station apparatus and the wireless terminals, and
the occupancy ratio for the plurality of regions in the buffer is determined based on the predicted first amount of the first traffic and the predicted second amount of the second traffic in the data communication.

6. A buffer control method comprising:
determining a plurality of regions in a buffer, wherein each region in the buffer is designated by one of a plurality of priorities;
acquiring predetermined information regarding data communication between a base station apparatus and external apparatuses other than the base station apparatus;
predicting an amount of traffic in the data communication based on the acquired predetermined information;

determining an occupancy ratio for the plurality of regions in the buffer based on the predicted amount of traffic in the data communication;

storing in a respective designated region, in accordance with the determined occupancy ratio, pieces of data each of which is assigned one of the plurality of priorities and transmitted within the base station apparatus from a first processing unit to a second processing unit via a high speed serial interface;

wherein the occupancy ratio represents a relationship between a storage capacity of one of the plurality of regions in the buffer to each storage capacity of remaining plurality of regions in the buffer.

7. A base station apparatus comprising:

a buffer comprising a plurality of regions, wherein each region in the buffer is designated by one of a plurality of priorities;

a memory; and a processor coupled to the memory and configured to:

store pieces of data each of which is assigned one of the plurality of priorities and transmitted within the base station apparatus from a first processing unit to a second processing unit via a high speed serial interface, in the buffer including regions each associated with one of the plurality of priorities;

read out the pieces of data from the buffer and to transmit the pieces of data to the second processing unit via the high speed serial interface;

predict an amount of traffic of data communication between the base station apparatus and external apparatuses other than the base station apparatus, based on predetermined information regarding the data communication; and determine an occupancy ratio for each of the regions in the buffer, based on the amount of traffic in the data communication predicted;

wherein the occupancy ratio represents a relationship between a storage capacity of one of the plurality of regions in the buffer to each storage capacity of remaining plurality of regions in the buffer.

* * * * *